United States Patent [19]

Ueda

[11] Patent Number: 5,031,380
[45] Date of Patent: Jul. 16, 1991

[54] PACKAGING MACHINE

[75] Inventor: Kazuo Ueda, Tokushima, Japan

[73] Assignee: Shikoku Kakoki Co., Ltd., Tokushima, Japan

[21] Appl. No.: 452,443

[22] Filed: Dec. 19, 1989

[30] Foreign Application Priority Data

Dec. 22, 1988 [JP] Japan .................. 63-325553

[51] Int. Cl.⁵ .................. B65B 9/08; B65B 61/00
[52] U.S. Cl. .................. 53/135.1; 53/552; 156/272.4
[58] Field of Search .................. 53/137, 129, 128, 552, 53/551, 550, 451, 450, 415, 410; 156/272.4

[56] References Cited

U.S. PATENT DOCUMENTS

| | | | |
|---|---|---|---|
| 3,528,867 | 9/1970 | Leatherman et al. | 156/272.4 |
| 4,077,308 | 3/1978 | Scully | 53/552 X |
| 4,384,438 | 5/1983 | Hilmersson | 53/552 X |
| 4,622,799 | 11/1986 | Boston | 53/451 X |
| 4,637,199 | 1/1987 | Steck et al. | 156/272.4 X |
| 4,726,171 | 2/1988 | Kreager et al. | 53/552 X |

Primary Examiner—James F. Coan
Attorney, Agent, or Firm—Armstrong, Nikaido, Marmelstein, Kubovcik & Murray

[57] ABSTRACT

A packaging machine for use with a paper-base laminate serving as a packaging material and having a thermoplastic synthetic resin layer on each surface of a paper layer comprises a container forming unit for forming a content-filled tube into baglike containers after the web is made into a tube and contents are filled thereinto. The unit has jaws for clamping the content-filled tube at regular lengthwise intervals each corresponding to one container to heat-seal the tube over a required width and cut the tube at the midportion of the seal width, and the jaws are provided with a high-frequency coil for heat sealing. The machine further has a unit for affixing a tape of aluminum foil for high-frequency induction heating to the web at the portion thereof to be heat-sealed before the web is made into the tube.

3 Claims, 2 Drawing Sheets

5,031,380

PACKAGING MACHINE

BACKGROUND OF THE INVENTION

The present invention relates to packaging machines, and more particularly to a packaging machine adapted to form a tube from a web serving as a packaging material, fill contents into the tube, cut the content-filled tube into lengths each corresponding to one container and finally make the lengths of tube into rectangular parallelepipedal containers.

The web for use with machines for preparing aseptic packages is a paper-base laminate including aluminum foil, but since this type of laminate is expensive, paper-base laminates having no aluminum foil are used for machines not adapted for asceptic packaging.

Packaging machines heretofore known for use with a web of paper-base laminate having no aluminum foil comprise a transport device for transporting the web along a specified path, a tube forming unit for forming the web into a vertical tube, a filling unit for filling contents into the tube, and a container forming unit for forming the content-filled tube into baglike containers. The container forming unit has jaws for clamping the content-filled tube at regular lengthwise intervals each corresponding to one container to heat-seal the tube over a required width and cut the tube at the midportion of the seal width. The jaws are provided with a heating plate for heat sealing.

With the conventional packaging machine, the heating plate is used as a heater, so that unless the temperature of the heating plate is fully controlled, the portion to be sealed will be melted insufficiently or excessively and will not always be sealed off properly. Further because the portion to be sealed off is heated from outside the laminate, the machine has the problem of necessitating a considerable period of heating time.

SUMMARY OF THE INVENTION

The main object of the present invention is to overcome the above problems and to provide a packaging machine adapted to seal off the contemplated portion properly within a shortened period of time.

The present invention provides a packaging machine which comprises a transport device for transporting a web along a specified path, a tube forming unit for forming the web into a vertical tube, a filling unit for filling contents into the tube, a container forming unit for forming the content-filled tube into baglike containers, the container forming unit having jaws for clamping the content-filled tube at regular lengthwise intervals each corresponding to one container to heat-seal the tube over a required width and cut the tube at the midportion of the seal width, the jaws being provided with a high-frequency coil for heat sealing, and a tape affixing unit disposed above the path of transport of the web upstream from the tube forming unit for affixing a tape of aluminum foil for high-frequency induction heating to the web at the portion thereof to be heat-sealed.

Thus, the packaging machine of the present invention includes a tape affixing unit disposed above the path of transport of the web and positioned upstream from the tube forming unit for affixing a tape of aluminum foil for high-frequency induction heating to the web at the contemplated portion thereof. Accordingly, the tape of aluminum foil is attached to the web at each portion thereof to be heat-sealed, using the affixing unit.

When the web is to be sealed, the aluminum foil is heated by the high-frequency coil serving as a heater. The heating temperature is controlled in accordance with the strength of current to be passed through the high-frequency coil.

According to the present invention, therefore, the tape of aluminum foil for high-frequency induction heating is attached by the affixing unit to the web at the portion thereof to be sealed, and for sealing, the aluminum foil is heated by the high-frequency coil to a temperature which is controllable by varying the strength of current to be passed through the coil. Consequently, the web can be sealed within a shorter period of time with higher reliability than when the aforementioned heating plate is used.

DESCRIPTION OF THE PREFERRED EMBODIMENT

An embodiment of the invention will be described below with reference to the drawings.

The web W to be used for the illustrated packaging machine is a laminate made primarily of paper and having a thermoplastic synthetic resin layer formed on each surface of a paper layer although not shown. The laminate includes no aluminum foil.

Figure 1:
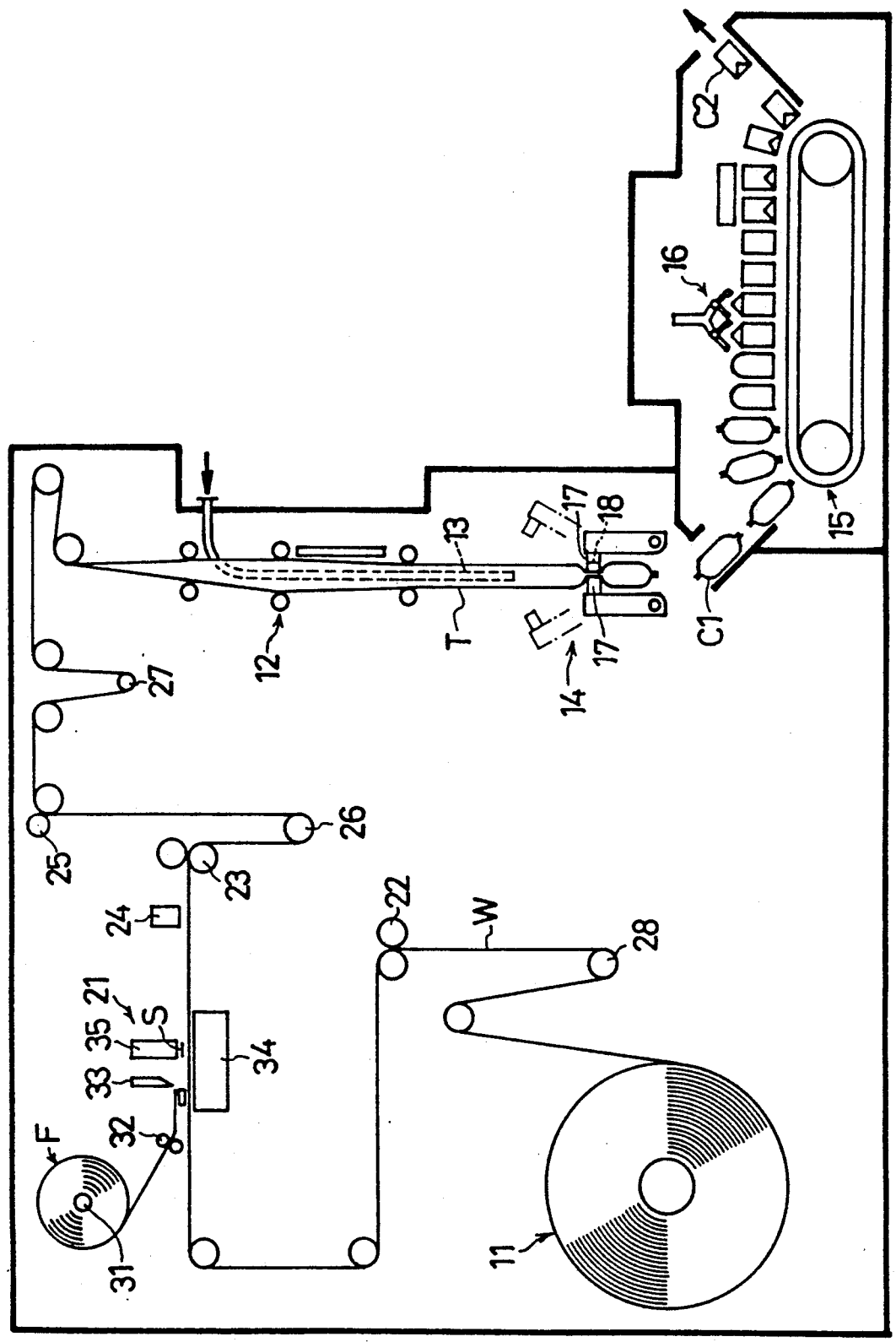
FIG. 1 is a diagram showing the construction of a packaging machine embodying the present invention.

With reference to FIG. 1, the packaging machine includes a web unwinding unit 11. The web W paid off from the unwinding unit 11 is guided upward, then rightward and finally downward as passed over guide rollers arranged suitably.

Arranged downward along the path of transport of the web W are a tube forming unit 12 for forming the web W into a tube T, a filling unit 13 for filling contents into the tube T, and a first container forming unit 14 for forming the content-filled tube T into baglike containers C1. Disposed below the first container forming unit 14 is a container conveyor 15 to provide a path of transport extending rightward from a position below the unit 14. A second container forming unit 16 is provided along the path of transport for finally forming each baglike container C1 into a rectangular parallelepipedal container C2. These units 11 to 16 are well known and will not be described in detail. Briefly described, the first container forming unit 14 has jaws 17 for clamping the content-filled tube T at regular lengthwise intervals each corresponding to one container to heat-seal the tube over a required width and cut the tube at the midportion of the seal width. Although not illustrated in detail, the jaw 17 has a high-frequency coil serving as a heater 18 for heat sealing.

A tape affixing unit 21 is disposed along, and closer to the left end of, the rightward path of transport of the web W extending from the unwinding unit 11 to the tube forming unit 12. The transport path is provided with intermittent drive pinch rollers 22 and 23 positioned upstream and downstream from the affixing unit 21, respectively. Marks on the web W are each detected by a mark sensor 24 disposed adjacent to and upstream from the downstream pinch rollers 23, whereupon the intermittent drive pinch rollers 22, 23 are driven in response to the resulting output signal from the mark sensor 24, whereby the web W is passed in a horizontal position through the location of the tape affixing unit 21 by a length at a time which length corresponds to one container. Continuous drive pinch rollers 25 are arranged downstream from the downstream pinch rollers 23. A dancer roller 26 is provided on a U-shaped web portion positioned between and hanging down from the downstream pinch rollers 23 and the continuous drive pinch rollers 25. A dancer roller 27 is also provided on another U-shaped web portion positioned between and hanging down from two guide rollers downstream from the continuous drive pinch rollers 25. A dancer roller 28 is further provided on another U-shaped web portion positioned between the hanging down from the intermittent drive upstream pinch rollers 22 and a guide roller disposed upstream therefrom.

The tape affixing unit 21 comprises a rewinder 31 supporting a roll of aluminum foil F, feed rollers 32 for intermittently feeding the aluminum foil F as unwound from the rewinder 31 by a length at a time which length is equal to the width of the tape S to be affixed to the web W, a cutter 33 for cutting the aluminum foil F fed by the feed rollers 32 into lengths equal to the length of intermittent feeding and allowing each length of foil to fall as the tape S onto the web W, and a support frame 34 and a liftable heating-pressing member 35 for pressing the fallen tape S into contact with the web W with heating.

The aluminum foil F is 10 micrometers in thickness and is covered over the both surfaces thereof with a polyethylene film having a thickness of 30 micrometers.

Figure 2:
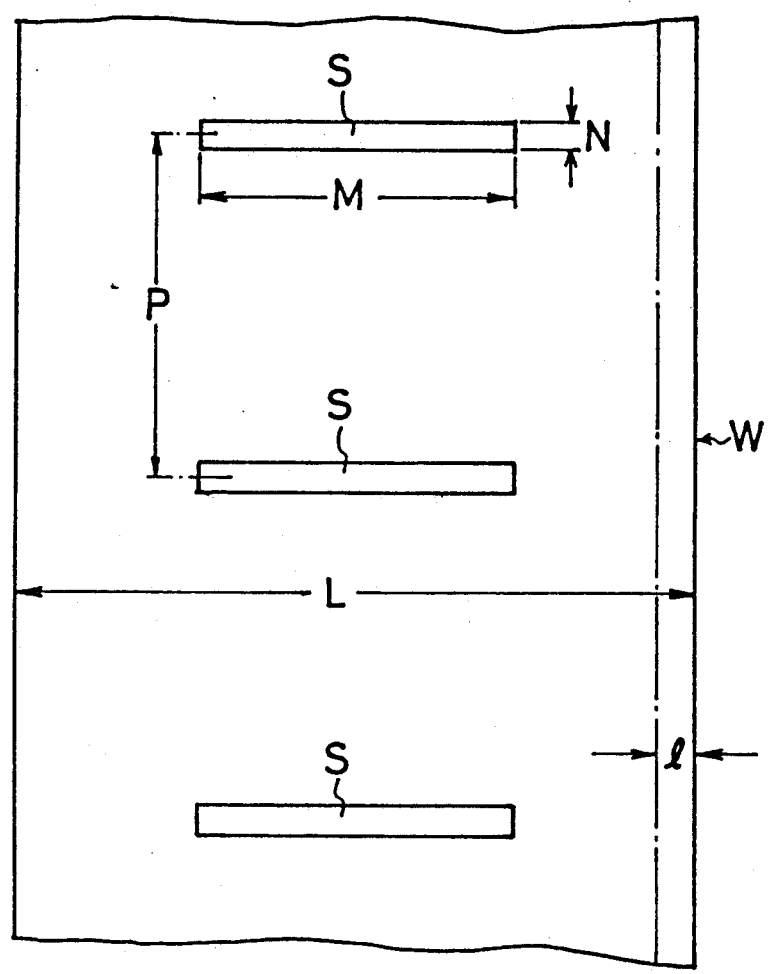
FIG. 2 is a diagram showing tapes as attached to a web.
Figure 3:
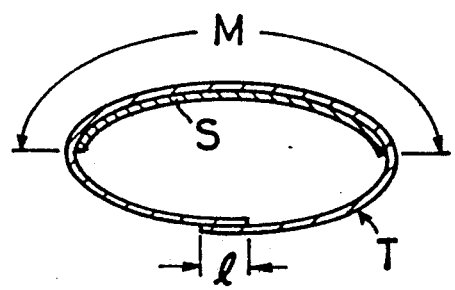
FIG. 3 is a diagram showing the web as formed into a tube and immediately before sealing.

FIG. 2 shows tapes S as affixed to the web W. The spacing P between the two adjacent tapes S corresponds to the length of one container. The tape S is positioned in the middle of the width of the web W and has a length M which is equal to one-half of the length obtained by subtracting from the width L of the web W the lap l of the web W over itself in the tube T formed from the web W (see FIG. 3). Thus, $M=(L-l)/2$. The width N of the tape S is about 10% of the length M. For example, the web W and the tape S have the following dimensions. L: 204 mm, l: 8 mm, M: 103 mm and N: 12 mm. When the web W as shaped to the tube T is to be sealed off, the tape S is positioned as a single layer inside the portion of the web W to be sealed as shown in FIG. 3.

What is claimed is:

1. A packaging machine for preparing content-filled containers from a web of laminate made primarily of paper and having a thermoplastic synthetic resin layer formed on each surface of paper layer, the packaging machine comprising:

a transport device for transporting the web along a specified path;

a tube forming unit for forming the web into a vertical tube of a predetermined width;

a filling unit for filling contents into the tube;

a container forming unit for forming the content-filled tube into bag-like containers, the container forming unit having jaws for clamping the content-filled tube at regular lengthwise intervals, each corresponding to one container to heat-seal the tube over a required width and cut the tube at the midportion of the seal width, the jaws being provided with a high-frequency coil for heat sealing; and a tape affixing unit disposed above the path of transport of the web upstream from the tube forming unit for affixing a tape of aluminum foil substantially across said predetermined width of said formed vertical tube for high-frequency induction heating to the web at the portion thereof to be heat-sealed.

2. A packaging machines as defined in claim 1 wherein the transport device has web feed means for intermittently transporting the web by a length corresponding to one container at a time so that the web passes in a horizontal position through the location of the tape affixing unit by the length at a time, and the tape affixing unit has unwinding means for intermittently unwinding the aluminum foil as wound up in the form of a roll by a length at a time which length is equal to the width of the tape to be affixed to the web, a cutter for cutting the aluminum foil fed by the unwinding means into lengths equal to the length of intermittent unwinding and allowing each length of foil to fall as the tape onto the web, and means for affixing the fallen tape to the web by the application of heat and pressure.

3. A packaging machine as defined in claim 2 wherein the web feed means comprises intermittent drive pinch rollers arranged on the path of transport of the web upstream and downstream from the tape affixing unit respectively, and the unwinding means comprises a rewinder disposed above the path for the horizontal passage of the web and supporting the roll of aluminum foil, and intermittent drive feed rollers arranged between the rewinder and the cutter, the affixing means comprising a fixed support frame disposed under the path for the horizontal passage of the web, and a liftable heating-pressing member disposed above the path for the horizontal passage.

* * * * *